United States Patent [19]

Twerdochlib

[11] Patent Number: 4,859,076

[45] Date of Patent: Aug. 22, 1989

[54] DIFFERENTIAL TEMPERATURE SENSORS

[75] Inventor: Michael Twerdochlib, Oviedo, Fla.

[73] Assignee: Westinghouse Electric Corp., Pittsburgh, Pa.

[21] Appl. No.: 196,706

[22] Filed: May 20, 1988

Related U.S. Application Data

[63] Continuation-in-part of Ser. No. 58,956, Jun. 5, 1987, abandoned.

[51] Int. Cl.[4] .................. G01 01/14; G01N 25/00
[52] U.S. Cl. ........................... 374/10; 136/230; 340/595
[58] Field of Search ............ 374/10, 164, 165, 11, 374/12; 136/230; 376/247

[56] References Cited

U.S. PATENT DOCUMENTS

| | | | |
|---|---|---|---|
| 1,189,785 | 7/1916 | Brown | 374/10 |
| 3,366,942 | 1/1968 | Deane | 73/204.11 X |
| 3,899,918 | 8/1975 | Privalov et al. | 374/11 |
| 4,154,085 | 5/1979 | Hentze | 374/10 |
| 4,449,403 | 5/1984 | McQueen | 73/295 |

Primary Examiner—Daniel M. Yasich
Attorney, Agent, or Firm—D. C. Abeles

[57] ABSTRACT

A heated, split thermowell comprises a cylindrical shank and integral, axially extending, part-cylindrical probes spaced by at least a first gap defined by a bilateral plane. The thermowell is mounted to the sidewall of a pressure vessel for communicating through a penetration in the sidewall with the fluid state in the pressure vessel. Each probe has at least one parallel axial bore therein, a related, selected pair of probes receiving respective heater and temperature sensing elements in the associated bores, and together functioning as a differential temperature sensor producing distinguishable, differential temperature outputs representative of the fluid condition of steam versus water. Duplex sensor embodiments permit toggling between different, selected such pairs of probes for on-line testing and verification of monitored conditions and operability of the elements and supporting circuits, with automatic substitution of complementary elements in the event of element failure. Each thermowell also permits on-line replacement of a failed element.

26 Claims, 9 Drawing Sheets

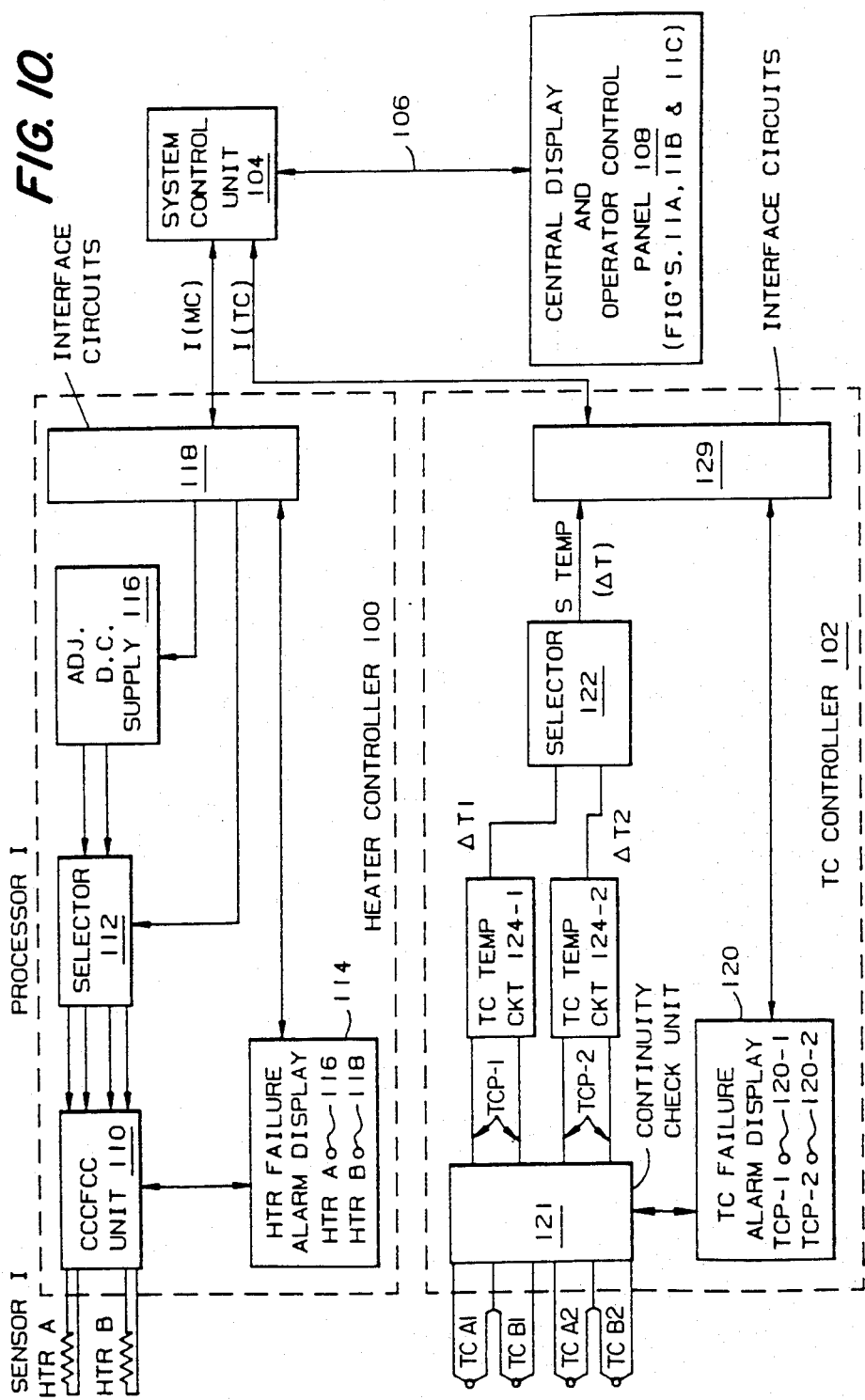

DIFFERENTIAL TEMPERATURE SENSORS

CROSS-REFERENCE TO RELATED APPLICATIONS

This application is a continuation-in-part of application Ser. No. 058,956 filed June 5, 1987 in the name of the same inventor and assigned to the common assignee as herein, and now abandoned. This application furthermore is related to the concurrently-filed application entitled "INSTRUMENTATION AND MONITORING SYSTEMS EMPLOYING DIFFERENTIAL TEMPERATURE SENSORS," a continuation-in-part of the same above-identified application and in the name of the same inventor and assigned to the common assignee, as herein. Both of the cross-referenced applications are incorporated by reference herein.

BACKGROUND OF THE INVENTION

1. Field of the Invention

This invention relates to differential temperature sensing, or detecting, devices and, more particularly, to improved, split-well differential temperature sensors, or detectors, for use in instrumentation systems for detecting the presence of water in a pressure vessel, such as a steam extraction pipe of a steam turbine system.

2. State of the Relevant Art

Differential temperature sensors, as are well known in the art, employ thermodynamic and fluid principles for selectively sensing the presence or absence of, and/or the creation or cessation of the flow of materials in a liquid or gaseous form. U.S. Pat. No. 3,366,942—Deane, illustrates one form of a prior art differential temperature sensor, used as a flow stoppage detector. The sensor, or probe, comprises a pair of heat sensing probes with a heater probe thermally connected therewith. The sensing and heater probes are adapted for being introduced into a conduit through which a material may flow. The heater probe is spaced more closely to one than to the other of the sensing probes. In the absence of flow, the sensing probe closer to the heater probe is at a higher temperature than the other sensing probe; conversely, when a fluid material flows past the probes, heat is conducted away from the heater probe and thus the temperature difference between the two sensing probes decreases, or disappears.

U.S. Pat. No. 3,898,638—Deane et al., illustrates another such differential temperature sensor, having the same basic configuration as that of the earlier Deane U.S. Pat. No. 3,366,942 but represented to have an improved internal structure of the temperature sensing probes which affords increased accuracy of measurements. As noted therein, differential heating of the two temperature sensing probes by the heater probe may be accomplished in part by, for example, the heat shunt running between the heater probe and the more adjacent of the two temperature sensing probes; further, both convection and/or conduction in the medium at rest, and conduction in the shunt, serve to carry heat differentially between the probes.

Another form of such differential temperature sensing probes, again having the same basic configuration of a pair of temperature sensors and a heater element disposed adjacent to one of the two temperature sensors, is disclosed in U.S. Pat. No. 4,449,403—McQueen. The particular application of the McQueen device entails utilizing plural such sensors in a vertically stacked array within a guide tube disposed within a reactor vessel, the outputs from the plurality of sensors providing an indication of the wet/dry condition of the coolant in the region of the fuel rods, among other purposes and functions. A particular concern in such reactor vessels is the presence of voids, e.g., a steam void, displacing the reactor coolant from the nuclear fuel rods, which then are inadequately cooled and may overheat. The composite device most specifically is disclosed for use in sensing the coolant properties under three regimes: subcooled (the normal operating condition); saturated liquid (the boiling condition); and saturated vapor (a voided condition). As noted therein, the improper conditions may result in "water hammer" effects producing pressure pulses which can break pipes, pipe supports, tanks, valves and other such vital equipment.

U.S. Pat. No. 4,440,717—Bevilacqua et al. likewise discloses an instrumentation system employing plural sensors at vertically spaced elevations and positioned within a nuclear reactor vessel, each sensor comprising a heater for heating one of a pair of thermocouples wired to provide both absolute temperatures and differential temperatures therebetween, for detecting the liquid coolant level within the vessel, again employing the difference in heat transfer characteristics between heat transfer to a liquid and heat transfer to a gas or vapor to sense the liquid level. Similar such sensors and related systems for use in nuclear reactor vessels or other pressurized water systems are disclosed in U.S. Pat. Nos. 4,418,035—Smith and 4,439,396—Rolstad. The Smith '035 patent moreover illustrates a block diagram form of a multiple function monitoring system employing such sensors.

While the differential temperature sensors, or detectors, of the present invention and instrumentation systems employing same as disclosed in the above cross-referenced applications have broad application, including use in sensing and monitoring pressure vessels of nuclear reactor systems as in the above-referenced patents, they have been developed with specific reference to the operation and preventive maintenance of steam turbine generators. Problems with such generators arising out of the induction of water or cool vapor into the steam turbines become more critical as the units age and particularly as they are used, increasingly, for cyclic and/or shift operation. Malfunctions of the equipment in the heat cycle can cause such induction to occur at various locations, including the main-steam inlet piping, the hot-reheat steam inlet piping, the cold-reheat steam piping, extraction connections, gland steam-sealing system, and turbine drains. Beyond the resulting structural damage and mechanical malfunctions caused by the induction of water or cool vapor, the resulting unscheduled down time of the equipment is a matter of serious concern.

In addition to the particular locations at which induction occurs, it is important to identify the various types of induction, i.e., the types of water induction events, which may occur. For example, induction may occur as a flow of a water film on the side of a pipe associated with the turbine produced typically by condensation of steam on the side of a cold pipe or from an overspray condition. Droplet or "chunk" flow may occur, visualized as a continuous projectile of water which may vary from the size of drops to walnuts and which may be mixed with steam. Slug flow may be produced, i.e., a slug of water which completely fills a section of pipe and is projected down the pipe, presumably by the flash-off of water. Two-phase flow as well has been identified, comprising generally an ill-defined "water-steam" mixture that may result from flash-off of high energy water, and may involve a core flow of solid water. Finally, a broad category exists wherein water may rise within a pipe, due to such sources as condensation, spray or flow, feed water heater tube leaks, and/or design deficiencies in the drain system, and to combinations thereof. It appears, however, that the vast majority of water induction events are of the slow rise type of the last category described, and which, moreover, may be the precursor to the other categories of water induction events. Thus, while not necessarily so limited in its scope, the sensors, or detectors of the present invention and the associated instrumentation systems are directed to this broader, last-mentioned category and thus to monitoring the condition within a pipe and more specifically for the detection of the relatively slow rise of water within a pipe associated with a turbine system. As noted, the sources of such water may be the boiler and feed water heaters, accumulation due to condensation, faulty sprayers and broken pipes, and accumulation arising from condensation within the turbine itself, in stages that operate in the wet region.

Beyond the specific sensors as disclosed in the foregoing patents, commercially available systems incorporating such differential temperature sensors for monitoring and detecting the presence of water have been developed. Solartron Protective Systems, a division of Solartron Transducers, owned by Schlumberger, offers a "Self-Validating Water Induction Monitoring System" under its registered trademark HYDRATECT -2455D. Resistivity measurements are made inside of a manifold by means of electrodes, which serve to discriminate between the resistivities of water and steam (or air). As described in its sales literature, the energized tip of an electrode is referenced to the body of the manifold, and the tip is insulated from the body by a high purity insulator. Pairs of such electrodes may be mounted in two-port manifolds in conduits, such as drain lines, to be monitored, each electrode detecting the presence of either water or steam, and its output being routed by independent connections to an electronic discrimination circuit. A discriminator circuit purportedly checks for component failures and declares same as occurring, within each electrode channel. A validation check between two electrode channels subjected to the same conditions is described as being performed, as a basis for indicating whether a fault exists. The HYDRATECT - 2455D system of Solartron, however, is deficient in many respects and inherently incapable of providing reliable, long-life characteristics. For example, the sensor is of generally cylindrical configuration and is adapted to be inserted through a penetration in the sidewall of a pressure vessel and secured thereto, as is conventional. A segment of the cylindrical structure comprises an annular band of insulating material, which insulates the electrode tip of the sensor from the remainder of the structure. A tight pressure seal, e.g., a porcelain to metal weld, must be provided at the respective interfaces of the insulating band with the electrode and with the remainder of the cylindrical sidewall of the sensor. The interfaces of dissimilar materials, i.e., porcelain and metal, renders in the sensor structure highly susceptible to leakage and eventually breaking, particularly in view of the rather hostile environment to which it is subjected (e.g., temperature cycling, vibration and the like). In typical experience, such sensors have a reliable lifetime only of from one to three years, at most. Not only do sensors of this type fail to provide the long-life characteristics essential to an effective monitoring system, their tendency to leak and break presents a serious threat to personnel. Moreover, because of their structure, as described and as will be appreciated, the sensors cannot be repaired or replaced while the system, which they are intended to monitor, is on-line.

Another commercial system is offered by Fluid Components, Inc. and set forth in its brochure entitled "Liquid Level & Interface Controllers," that brochure citing protection for the disclosed systems under the above-referenced U.S. Pat. Nos. 3,366,942, 3,898,638 and 4,449,403. Sensors incorporating probes as disclosed in those patents are employed for measuring temperature differentials. The specific values of the output signals are stated to be governed by the media in contact with the probes and thus, for example, liquid/gas and liquid/-liquid interfaces as well as wet/dry conditions purportedly may be detected. Monitoring and calibration circuits for the liquid level and interface controllers associated with the sensors are indicated to be available. These sensors and associated controllers, however, are not suitable for the hostile environment of steam turbine systems and, particularly, for performing the requisite sensing functions for anticipating problems of water induction. For example, the sensors cannot withstand the involved high pressure and temperature conditions. The sensors, moreover, are asymmetric and inherently lack any duplex functional capability as has been determined, in accordance with the present invention, to be essential to the effective and reliable monitoring and control of such systems. For example, an important fouling test, performed by the sensor and related system of the present invention, is incapable of being performed by an asymmetric sensor and a system incorporating same; moreover, since lacking any duplex configuration, there necessarily is no capability of on-line, automatic substitution for a failed element, e.g., a heater element. The specific structure of the sensors, moreover, does not permit physical replacement of failed heater and/or thermocouple elements while on-line. Moreover, such sensors and necessarily the related systems will not work in a steam flow environment in the absence of a shield surrounding the heater and thermocouple elements, since even low steam velocities will remove heat more rapidly than water.

Despite incorporating advances in technology, currently available sensors and monitoring and alarm systems employing same, as reported in the literature above-identified, have failed to satisfy critical needs in the industry. For example, the above-noted problem of water induction in steam turbines, while recognized and studied since the early 1970's, has yet to be adequately resolved.

Water induction incidents have become of such concern that the ASME (American Society of Mechanical Engineers) established a Committee on Turbine Water-Damage Prevention; plant design recommendations to prevent water damage are contained in ANSI/ASME Standard No. TDP-1-1985. More recently, studies done by the assignee of the present invention for EPRI in actual operating power generating facilities are set forth in a final report prepared and released by EPRI as report CS-4285, "Detection of Water Induction in Steam Turbines. Phase III: Field Demonstration." These studies emphasize the continuing, critical need for reliable sensors and monitoring systems for use in the environment of steam turbines, to detect the severe problem of water induction.

SUMMARY OF THE INVENTION

Accordingly, there remains a critical need for improved differential temperature sensors and related monitoring and alarm systems, for reliably detecting the potentially serious water induction problems in steam turbine installations, as well as for detecting a liquid/gas (vapor) condition and/or any change therein in other high pressure and high temperature environments such as those which exist in nuclear reactor vessels. Perhaps most critical to water induction monitor systems for use with steam turbines, is the fact that the sensors and associated control systems typically remain inactive for many years, before the system is called upon to generate a response indicating that a water event may take place. Over such extended time periods, however, it is predictable that periodic failure of the electrical elements, i.e., both the heater and the thermocouple elements, will occur, due to the vibration and cycling conditions to which they are exposed. It follows that the sensor device itself must be of rugged construction and sufficient mechanical strength so as to withstand, over essentially indefinite time periods, the high temperature and pressure conditions, and cycling thereof, as well as the vibrations to which it is subjected, while nevertheless affording highly accurate and reliable outputs. Because of the potential of failure of both the heating and the temperature sensing elements in such sensors, the sensors and the associated monitoring and control circuitry must afford on-line test capabilities, as well as the capability of on-line replacement of the heater and thermocouple elements of the sensors. Each sensor, moreover, should afford duplex, or redundant, components; likewise, the associated control and monitoring circuitry should produce automatic alarm indications upon detection of such failures, as well as automatic toggling or switching to the duplex or redundant elements upon detection of failures.

A closely related concern is that the number of penetrations through the sidewall of the vessel within which conditions are to be monitored, i.e., to accommodate the sensors, be minimized, from both structural integrity and installation efficiency standpoints. Further, taking into account the desired duplex capability, assuring accuracy of the sensor outputs dictates that substantially the same conditions be monitored by the respective, duplex elements of each sensor.

The differential temperature sensors in accordance with the present invention, and the instrumentation systems incorporating same as disclosed in the above, cross-referenced applications, overcome the foregoing and other problems and deficiencies of the prior art, and satisfy the objectives above-noted.

The sensors, or detectors, of the invention, in accordance with various different disclosed embodiments thereof, uniformly are of rugged design and afford reliable and safe pressure vessel penetration—and a minimum number of such penetrations for a given level of accuracy and verified monitoring capability by the associated instrumentation system. The various disclosed embodiments accommodate the requisite heater and thermocouple elements to afford the desired differential temperature sensing, or detecting operation, along with on-line testability and on-line replaceability of those elements; moreover, in certain preferred sensor embodiments of duplex character, automatic substitution of failed elements may be performed by the associated instrumentation system, in actual operation. All share a basic, or generic, structural configuration of a generally cylindrical thermowell body which is split by a small gap along a bilateral plane forming, effectively, two identical half-cylinder probes which are integrally joined to and extend from a common, cylindrical shank portion. In another embodiment, the body is split by a second bilateral plane, crossed, or transverse, relative to the first and thus defining four identical quarter-cylinder probes. Accordingly, the expression part-cylinder, generic to both, is adopted, where applicable. The shank portion is threaded on a section of its exterior circumference for being received and secured in a boss welded to a steam line or other pressure vessel; alternatively, a socket weld connection may be made. The part-cylinder probes thus project into the interior of the line, or may be recessed into a boss, and in either such installation, are in communication with the fluid condition in the line, or vessel, for performing the sensing-/detecting function. Accordingly, the generic expression is adopted that the detector, or sensor, is mounted to a pressure vessel with the probes in communication with the fluid in the pressure vessel, the condition of which is to be monitored. The shank is bored from its upper, free end to define a generally cylindrical access chamber therein, terminating in a base wall at the juncture of the shank and the half-cylinder probes.

In accordance with a first preferred embodiment of the sensors of the invention, a central bore and a pair of bores symmetrically displaced relatively to the central bore extend in parallel-axial relationship into each half-cylinder probe from the base wall; within each half-cylinder probe, the heater element is inserted into the central bore and a pair of thermocouple sensor elements is inserted into the corresponding pair of symmetrically displaced bores. Thus, the sensor is of duplex configuration and functional capability, either probe being selectable as the heated probe/thermocouple and accordingly the heater element thereof being supplied with electrical power, and the other probe with the inactive heater element providing the nonheated thermocouple element, thereby to function as a differential temperature sensor. As will be more fully described in the following, the opposite complementary elements of the two probes may be selected in the alternative; this duplex configuration affords many advantages, including automatic switching or toggling between the complementary sets of heater elements for performing verification and fouling tests and for automatic substitution of complementary elements upon detection of element failure, thereby to afford continuous monitoring functions despite individual element failure.

By virtue of the connection of the shank to the pipe or vessel wall, the latter functions as a temperature sink affording thermal isolation between the heated and unheated half-cylinder probes, enhancing the accuracy of the thermocouple outputs. A connector box is affixed to the upper, free end of the shank for connecting the electrical leads of the heaters and the thermocouples through a cable to external monitoring, control and power circuits. The sensor design provides for securing the elements in their inserted positions, while permitting ready, on-line access to the heater and thermocouple elements for replacement, without any need for removing the thermowell housing.

When employed with an appropriate instrumentation and monitoring system, as disclosed partially herein and more fully in the above, cross-referenced applications, the system may perform continuity checks of both the heater and the associated pair of thermocouple elements of each sensor probe on a continuous basis, and provide suitable indications of failure of any of these elements. When a failed element is detected, the system automatically switches to the complementary set of elements, as is required to correct for and thus exclude the failed element. This insures continued operation of the sensor and prevents false alarms that would otherwise result upon a component failure. More specifically, the sensor functions as a differential temperature sensor, as above explained. Thus, identifying the two half-cylinder probes as A and B, heater A may be initially energized. One of the symmetrically disposed thermocouples A1 and A2, for example A1, then is employed in conjunction with one of the thermocouples B1 and B2 of probe B, for example, thermocouple B1. Should either of thermocouples A1 and B1 fail, the system automatically switches to the respective, complementary thermocouples A2 and B2. Similarly, should heater A fail, the system automatically switches to heater B. As will be appreciated, the differential temperature indication ($\Delta T$) should be of the same value but opposite sign. The switching or toggling capability, afforded by the duplex character of the sensor, thus enables automatic correction for failed elements, without loss of continuous monitoring and without producing a false alarm. Moreover, the validity of testing operations is enhanced, since by toggling between heater A and heater B during on-line testing, and comparing the resulting, respective outputs, i.e., $\Delta T$ indications of equal value but opposite signs should be produced, the system can confirm that the sensor has not been fouled by accumulation of material on the probes and that the calibration remains valid.

In accordance with the second preferred embodiment of the invention, an integrated detector, or sensor, similarly employs a generally cylindrical thermowell body having two (or four) identical part-cylinder probes but only a single bore is formed in each of the probes. A single heater/thermometer element, effective to simultaneously heat and measure the temperature of the probe, is received in each bore. The heater/thermometer element is of nickel, iron or other similar, pure metal, having a value of electrical resistance which is substantially linearly dependent on temperature. As to each related pair of probes, the heater/thermometer element of one is supplied with sufficient current for heating its corresponding probe and the other with a much smaller current, the former functioning as the heated element, or probe, and the latter as the reference element, or probe. Conveniently, the two heater/thermometer elements are connected as corresponding arms of a bridge and predetermined, proportionately related currents are supplied thereto, the voltage drop across the heater/thermocouple element of the reference probe being correspondingly multiplied by the same proportionality factor and the multiplied value being compared, in opposite sense, with the voltage drop across the heated element by a differential amplifier. The resultant differential voltage ($\Delta V$) thus obtained represents the value of the temperature differential ($\Delta T$) between the selected pair of problems (i.e., $\Delta T = k(\Delta V)$ where "k" is a known constant). Similarly to the first embodiment, a high level differential is maintained when the sensor probes are exposed to steam, and is substantially reduced when the probes are surrounded by water. This embodiment has a duplex character, permitting toggling, as above-described, for enhanced monitoring/testing operations.

In accordance with another embodiment, of an integrated sensor, or detector, of the invention, two bores are symmetrically disposed in each of the two half-cylinder probes and four such heater/thermometer elements are received in the respective bores. There thus are provided two pairs of heater and reference elements, each such pair comprising one element from each of the two half-cylinder probes. Preferably, the bores are formed in symmetrical relationship in the respective probes and the two sets of, effectively, diagonally-related elements are associated as the respective two pairs. This embodiment thus has a duplex character affording the switching or toggling capability above-described, thus enhancing the validity of the monitoring/testing operations and enabling automatic corrections/substitutions upon element failure.

In accordance with yet another embodiment of the integrated sensor, or detector, of the invention, the cylindrical thermowell body is split by two small, crossed gaps along corresponding, crossed bilateral planes, the planes preferably being perpendicular and intersecting along the axis of the cylindrical thermowell body so as to define, effectively, four identical half-cylinder probes. This embodiment affords the same duplex character and the related switching or toggling capability as that just above described, and the further capabilities of parallel, independent operation, with "voting" as to the dual, monitored condition T outputs. Relating the four elements as before, i.e., as two corresponding pairs, redundant, high temperature differential outputs from both pairs enhance the assurance of the detected condition indication of steam, i.e., no water; likewise, redundant low temperature differential outputs enhance the reliability of the detected condition of the presence of water. Conflicting high and low temperature differential output indications of the respective pairs in either sense, on the other hand, indicate a failed or possibly fouled sensor.

The integrated sensors, or detectors, of the invention, in addition to affording expanded and more versatile detection functions in the successively more complex configurations, offer the added advantage of a reduction in size with concomitant reduction in the costs of manufacture and installation and, even more significantly, an improvement in thermal performance and mechanical strength.

These and other features and advantages of the differential temperature sensors of the invention will become more apparent with reference to the following detailed description and drawings.

BRIEF DESCRIPTION OF THE DRAWINGS

FIG. 10 is a schematic, partially in block diagram form, of the instrumentation and monitoring system of FIG. 9;

DETAILED DESCRIPTION OF THE PREFERRED EMBODIMENT

Figure 1:
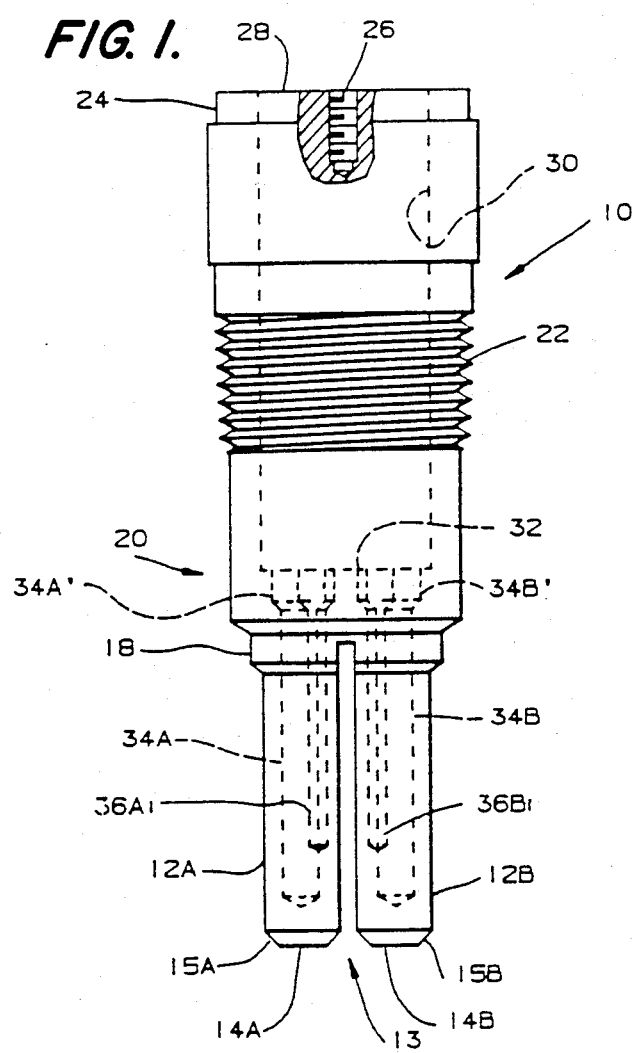
FIG. 1 is an elevational view of the split-well thermowell housing of the sensor in accordance with a first embodiment of the present invention.
Figure 2:
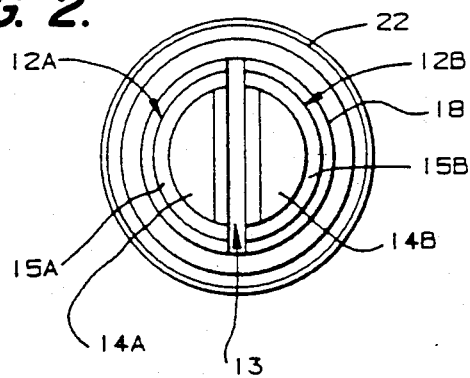
FIG. 2 is a bottom plan view of the split-well thermowell housing of FIG. 1.
Figure 3:
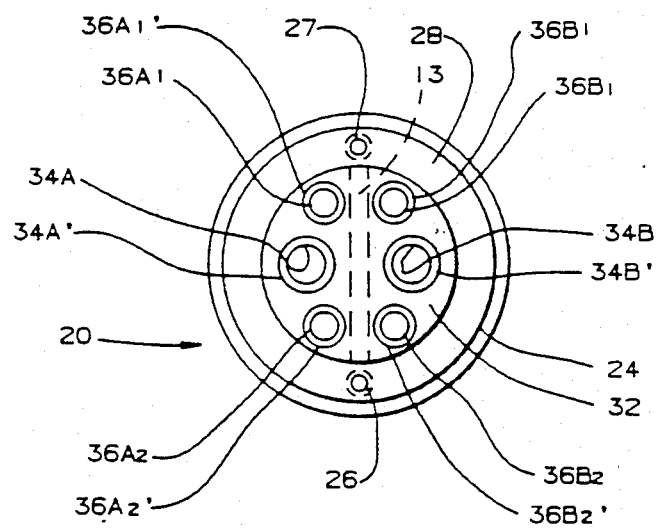
FIG. 3 is a top plan view of the split-well thermowell housing of FIG. 1.

FIG. 1 is an elevational view of the housing 10 of the split-well thermowell sensor of the first embodiment of the present invention and is described concurrently with reference to the bottom plan and top plan views thereof shown in FIGS. 2 and 3. The sensor housing 10 preferably is formed of a cylindrical bar of stainless steel or other, mechanically strong but poor heat-conducting metal, which is machined to the configuration illustrated in the drawings and herein described. One end of the bar is machined to define two identical, substantially half-cylinder sensor probes 12A and 12B delineated by a bilateral plane, identified at 13, which is cut therebetween. The ends, or tips, 14A and 14B of the probes 12A and 12B further are machined to define chambers 15A and 15B. The opposite ends, or bases, of the probes 12A and 12B thus extend integrally from a shank portion 20 of the sensor housing 10, a collar 18 of slightly larger diameter than the exterior circumference of the probes 12A and 12B is formed at approximately the juncture of the shank 20 and the probes 12A and 12B, for a purpose to be explained. A pipe thread is formed on section 22 of the shank 20, for mounting the housing 10 in a correspondingly threaded boss that is welded into the steam line, in a conventional manner. An annular mounting ledge 24 is formed on the outer surface of the upper, free end of the shank 20, and threaded holes 26 and 27 are formed in the annular end surface 28 of the shank 20, for purposes to be described.

Shank 20 is bored from its upper free end to define a generally cylindrical chamber 30 extending coaxially through a substantial portion of the length of the shank 20 and terminating in a base wall 32, adjacent the juncture of the base ends of the probes 12A and 12B. Central bores 34A and 34B extend in parallel axial relationship from the base wall 32 into the probes 12A and 12B, respectively, to a position closely adjacent the tips 14A and 14B thereof. The bores 34A and 34B are provided to accommodate generally elongated and cylindrical heater elements (not shown in FIGS. 1 to 3), as later described. Symmetrically disposed about the bores 34A and 34B are further bores 36A1, 36A2 and 36B1, 36B2, respectively, which extend approximately two-thirds of the axial length of the probes 12A and 12B, respectively, and which are provided for receiving corresponding thermocouple elements (not shown in FIGS. 1 to 3).

The overall axial length of the sensor housing 10 may be approximately six inches and the maximum diameter approximately two inches, the threaded portion 22 corresponding to a standard one and one-half inch pipe tap which is formed in the boss, for mounting the housing 10 as before described. The bilateral planar gap 13 separating the sensor probes 12A and 12B may be approximately one-eighth of an inch thick and the diameter of the outer circumference of the probes 12A and 12B may be approximately one and one-quarter inches. The bores 34A and 34B for the heater elements may be 0.257 inch diameter by 2.5 inch depth, measured from the base wall 32 and the bores 36A1, 36A2 and 36B1, 36B2 for the thermocouple elements may be 0.136 inch diameter and 2.00 inches deep. Each of these bores further is counterbored to a slightly larger diameter and about one-quarter of an inch in depth, as identified by identical, but primed numerals 34A', 34B', 36A1' . . . 36B2'.

Figure 5:
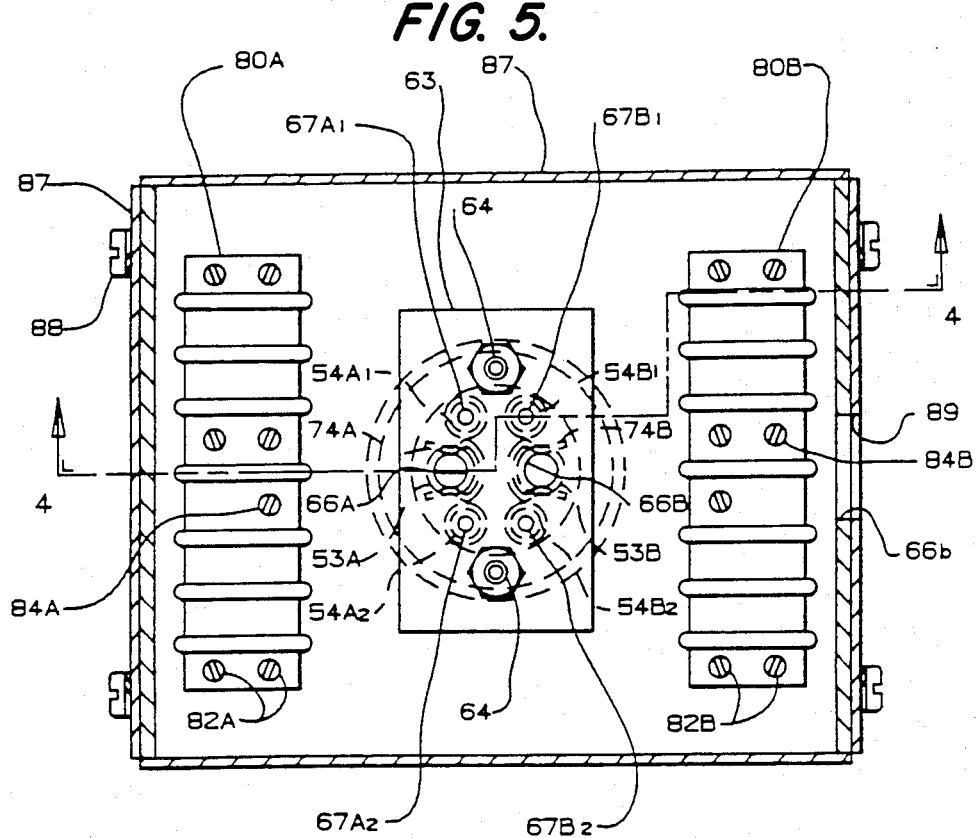
FIG. 5 is a top plan view, partially in cross-section, taken along a broken plane passing through the line 5—5 in FIG. 4.
Figure 4:
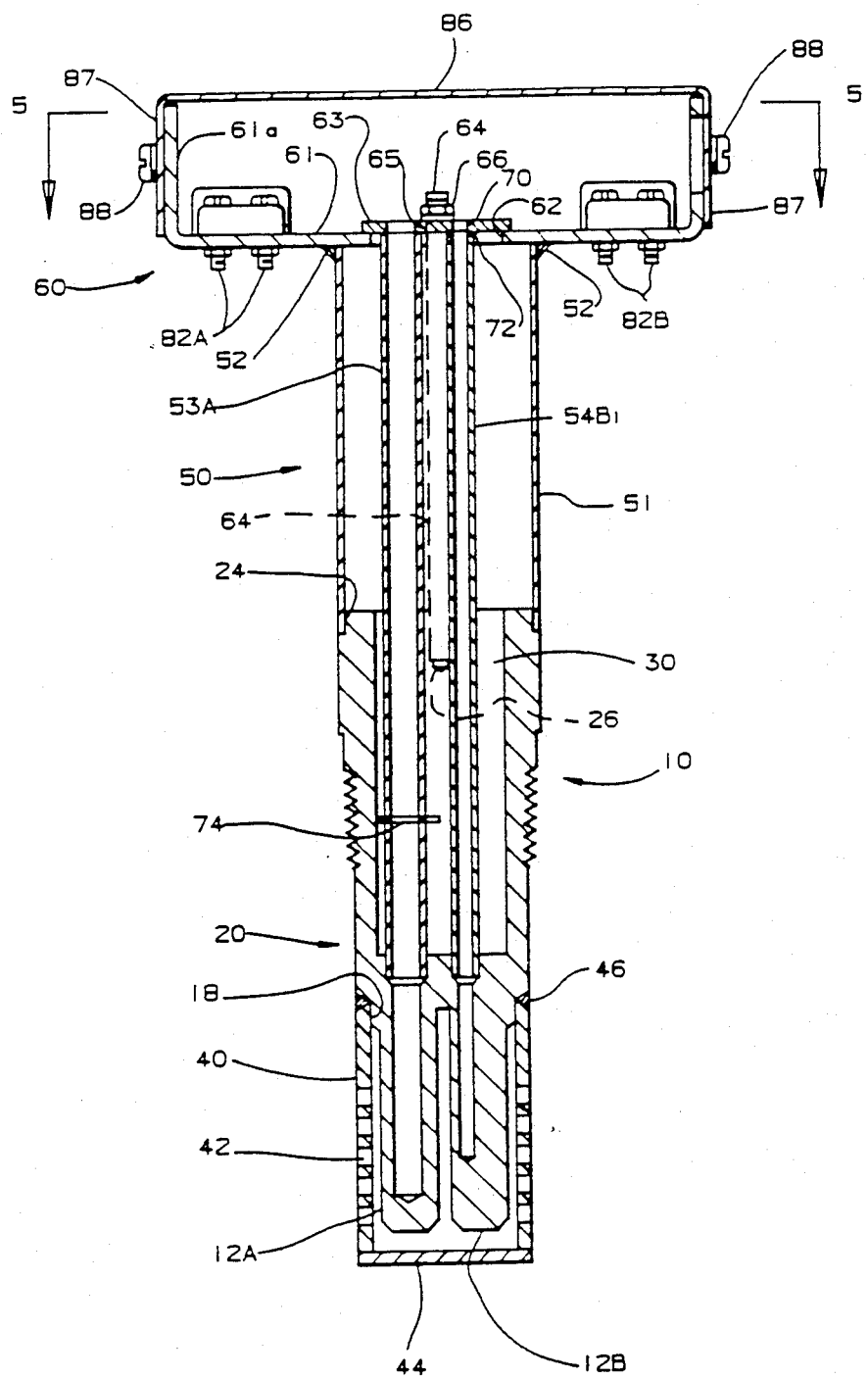
FIG. 4 is an elevational and cross-sectional view of the assembly of the sensor of the invention, taken in a plane through the axis of the split-well thermowell housing of the invention as shown in FIG. 1, and further including an electrical connector box and related structures.

FIG. 4 is an elevational and cross-sectional view, taken in a broken plane along the line 4—4 in FIG. 5, of the sensor housing 10, illustrating the completed assembly of the sensor. A protective shield 40 having apertures 42 in its cylindrical sidewall 43 and, typically, a base 44, which may also contain apertures, is disposed about the sensor probes 12A and 12B and secured at its upper, free end at the collar 18 of the shank 20 of the sensor housing 10 by a weld bead 46. The primary function of the shield 40 is to reduce the velocity of the steam flow around the split wells, or probes, of the sensor and yet allow water to enter. A high steam flow velocity may cause the heated sensor probe to be cooled as effectively as water. Thus, the apertures 42 are arranged symmetrically in the shield 40 so as to permit a minimum or limited amount of flow in immediate contact with the sensor probes and thus within the sensor chamber defined within the interior of the shield 40, when the sensor is disposed in the steam flow path. Since the apertures 42, while symmetric relative to the probes 12A and 12B, are not necessarily uniformly disposed about the cylindrical sidewall 43 of the shield 40 and instead are aligned perpendicularly to the direction of flow, the sensor must be properly oriented with respect to the direction of steam flow, when installed. Holes may also be placed in the base of the shield.

Extension assembly 50 releasably mounts an electrical connector box 60 to the upper free end of the housing 10. The assembly 50 comprises a cylindrical sleeve 51 which is telescopingly received at its lower end in the annular ledge 24 of the housing 10 and is welded at its upper end to the base wall 61 of box 60, as indicated by weld bead 52. To better appreciate the illustration of FIG. 4, it is taken in a segmented plane along the line 4—4 in FIG. 5. The extension assembly 50 thus comprises two elongated tubes 53A and 53B which are received at their bottom ends, as seen in FIG. 4, in the counterbores 34A' and 34B' which accommodate the heater elements A and B (not shown) and extend at their upper ends to a position flush with the interior surface of base wall 61 of connector box 60. Similar, but smaller diameter tubes 54A1, 54A2 and 54B1, 54B2 are received at their lower ends in the corresponding counterbores 36A1', 36A2' and 36B1', 36B2' and similarly extend to the upper surface of the base wall 61 and connector box 60. The base wall 61 includes a central aperture 62 to accommodate the various tubes, just described.

Within the connector box 60, plate 63 is disposed over and spans aperture 62. Threaded rods 64 are received in the threaded bores 26 of the sensor housing 10 and are received through holes 65 in the plate 63, extending thereabove so as to receive nuts 66 for securing the plate 63 and, through it, the connector box 60 and extension assembly 50 to the sensor housing 10. Holes 66A and 66B are formed in the plate 63 for permitting passage therethrough of the electrical connections (not shown) to the heater elements; similarly, holes 67A1, 67A2 and 67B1, 67B2 are formed in the plate 63, corresponding to the four thermocouples to be received in the sensor housing 10. FIG. 4 illustrates an illustrative thermocouple 70, as received in and passing through plate 63, the upper end being broken-away. A true arc ring 72 is received about the upper end of the thermocouple 70 and engaged by the under surface of plate 63, thereby to secure the thermocouple 70 in position. Spring-type snap rings 74A and 74B are received through slots formed in the sidewall of the corresponding tubes 53A and 53B, which secure the heater elements (not shown in FIGS. 4 and 5) within the corresponding tubes 53A and 53B. Terminal strips 80A and 80B are secured on the base plate 61 by screws and nuts 82A and 82B; sufficient terminal screws 84A and 84B are provided on the respective strips 80A and 80B for connection to the leads from the respective thermocouples and heaters of the probes 12A and 12B—which will be understood to be six (6) in number, for each probe half.

Figure 6:
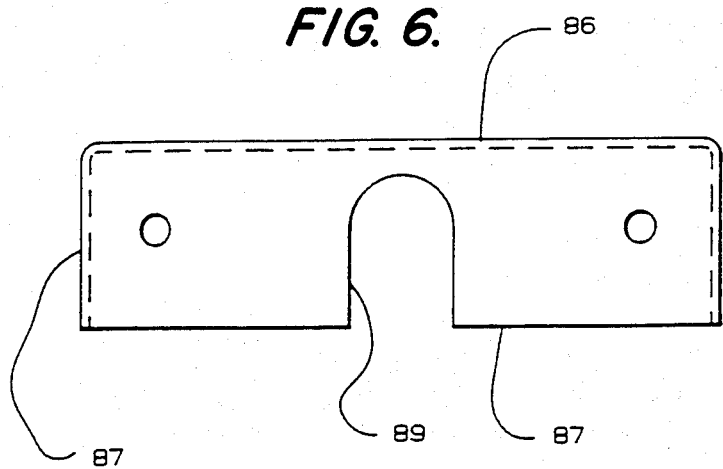
FIG. 6 is an end elevational view of a cover component of the connector box, shown in cross-section in FIGS. 4 and 5.

With concurrent reference to FIGS. 4, 5 and 6, a cover plate 86 has four (4) downwardly depending sides 87 and is received over the upturned ends 61a of the base plate 61 and secured in position by self-tapping screws 88. Mating openings 89 and 66b are provided to accommodate a cable (not shown) for connection to the connector screws 84A and 84B of the terminal strips 80A and 80B.

Figure 7:
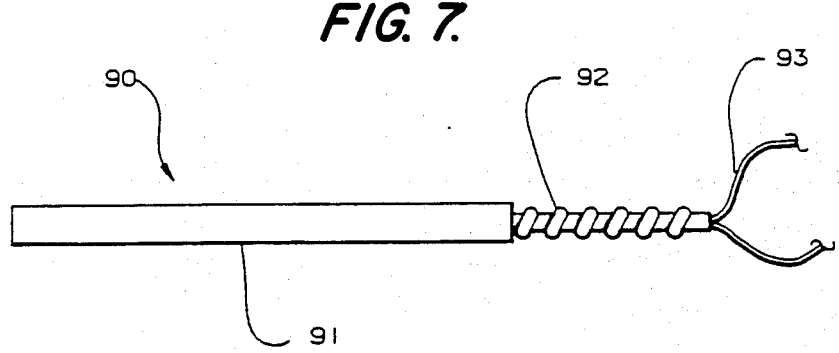
FIGS. 7 and 8 are plan views of heater and thermocouple components, respectively, utilized in the sensor of the invention.

FIG. 7 is an illustration of a heater element 90 for use in the sensor of the first embodiment of the present invention. It comprises a generally cylindrical heater element portion 91 having a grooved tip portion 92 from which leads 93 extend. With reference to FIGS. 4 and 5, clip 74 is received in the groove portion 92 for securing the heater element 90 in position. A preferred heater element is of a commercially available type known as a FIREROD CARTRIDGE HEATER, manufactured by the Watlow Company of St. Louis, Mo., and identified by code E1A51; it is of one-quarter inch diameter and three inches in length, rated at 120 volts and 80 watts of power.

Figure 8:
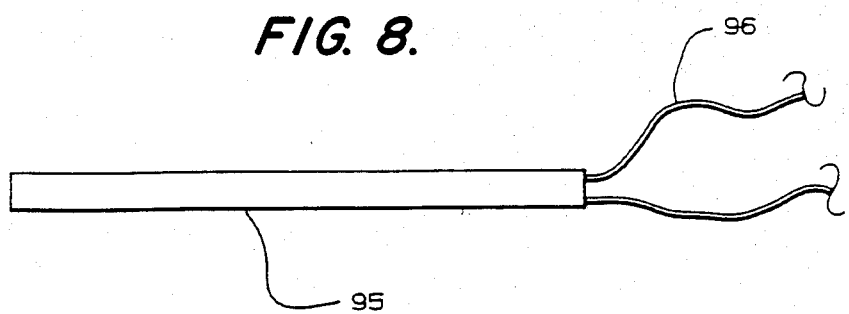

FIG. 8 illustrates a plan view of a thermocouple 95 as is contemplated for use in the invention, having a generally elongated cylindrical body and leads 96. Commercially available thermocouples may be used, a preferred one being Model CAIN-18U-10RP manufactured by Marlin Manufacturing Company of Cleveland, Ohio. The structure is approximately 10 inches long which correspondingly is accommodated by the sensor housing 10 and extension assembly 50, as seen in the preceding FIGS. 4 and 5.

In addition to the rugged construction and low cost of manufacture and installation afforded by the sensors of the first embodiment of the invention, the duplex character thereof affords significant operational advantages, as well as simplifying maintenance operations by on-line replacement of defective or failed elements. These aspects of the duplex sensor of the first embodiment of the invention will be more readily appreciated by the following description, taken in relation to FIGS. 9 and 10 of a system and related circuitry utilizing the aforesaid sensors. A more detailed description of such a system is provided in the above, cross-referenced applications.

Figure 9:
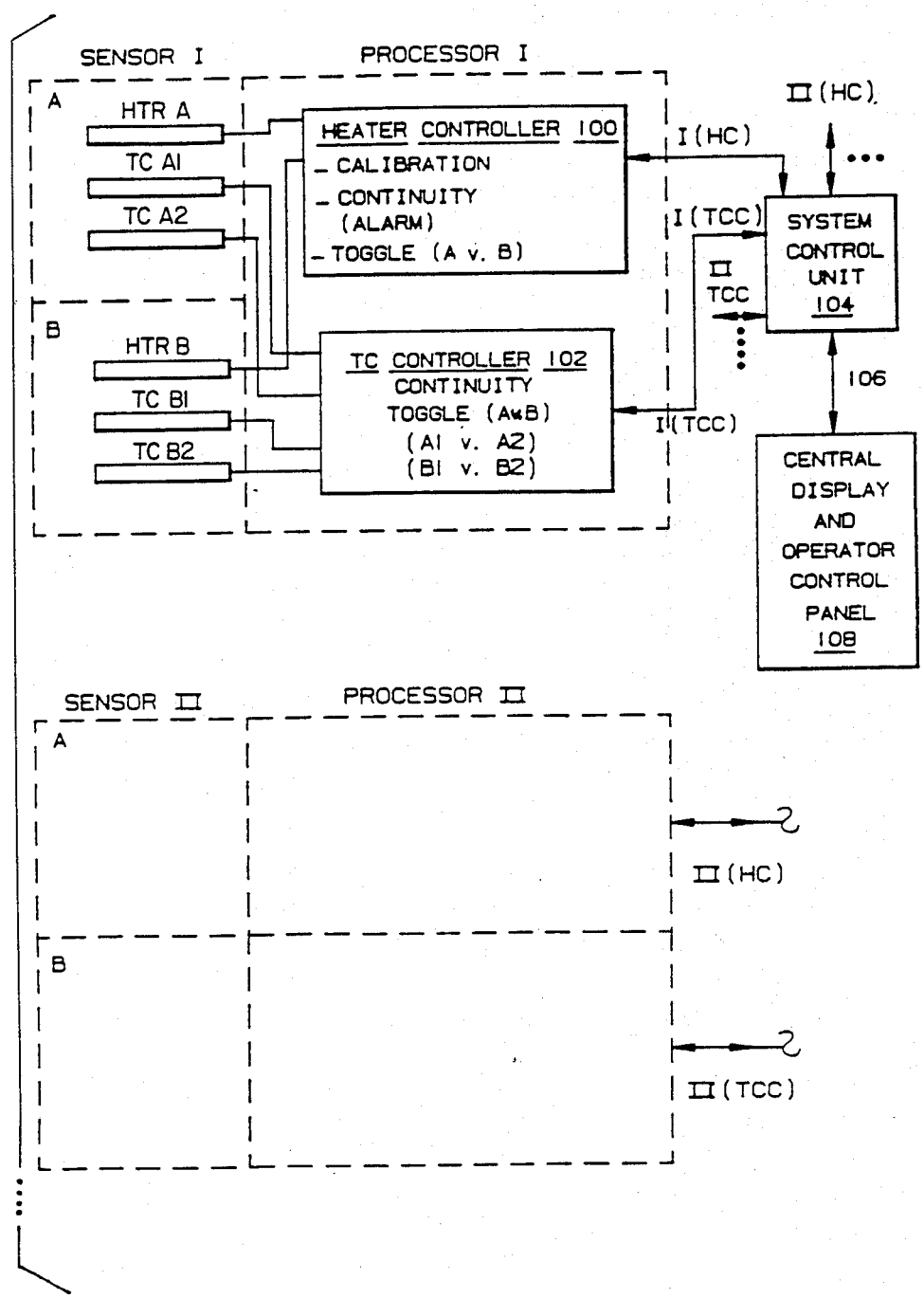
FIG. 9 is a schematic block diagram of an instrumentation and monitoring system employing multiple sensors of the split-well type of the first embodiment of the present invention.

FIG. 9 is a block diagram of an instrumentation and monitoring system for plural sensors of the type of FIGS. 1 through 8 of the present invention. In FIG. 9, two such sensors, designated sensor I and sensor II, are illustrated, it being understood that numerous sensors typically would be accommodated in the system. Since each sensor is of identical construction, the duplex, internal elements of the probes are schematically illustrated only for sensor I; consistent with the element number/letter designations in FIGS. 1 through 8, sensor I comprises the dual probes A and B respectively comprising heater (HTR) A and heater (HTR) B, and thermocouples (TC) A1, A2, and thermocouples (TC) B1, B2. In similar fashion, processor I for sensor I includes a heater controller 100 and a thermocouple (TC) controller 102, respectively interconnected through bidirectional buses I (HC) and I (TC) to a system control unit 104. Unit 104 further is connected over plural such buses II (HC), . . . and II (TC), . . . to corresponding controllers (HC and TC) of plural, respective processors II, . . . and associated sensors II, . . . , and over a bidirectional bus 106 to a central display and operator control panel 108. As more fully described hereafter, heater controller 100, under controls from system control unit 104, provides for calibration, on-line testing (e.g., continuity checking and shorts and grounds, processing of alarm indications, and toggling of heaters A and B of sensor I. Similarly, under control of the system control unit 104, the thermocouple (TC) controller 102 performs corresponding functions for the respective thermocouples A1 and A2, and B1 and B2, e.g., on-line testing and automatic switching functions upon element failure.

FIG. 10 is a schematic illustration, partially in block diagram form, of details of the components of the instrumentation and monitoring system of the invention for a single processor I (i.e., as in FIG. 9) including a heater controller 100 and a TC controller 102. As shown, interface circuits 118 and 129 in the controllers 100 and 102, respectively, interface between the internal components of the latter and the system control unit 104. Heater elements HTR A and HTR B are independently connected through a continuity check, current flow check, and calibration ("CCCFCC") unit 110 and through a switch, or toggle, selection circuit (SELECTOR) 112, to an adjustable power supply 116. Display unit 114 includes alarm lamps 116 and 118, respectively corresponding to the heater elements HTR A and HTR B, and which are respectively and independently illuminated when the corresponding heater element has failed, by corresponding outputs from the unit 110. The associated units 110 and 114, unit 112 and the adjustable DC supply unit 116 are connected through interface circuits 118 and appropriate buses, as shown, to a system control unit 104.

System control unit 104 automatically adjusts the output of the DC supply unit 116 in accordance with conditions determined by the CCCFCC unit 110 and further in accordance with the selection of heater element HTR A or HTR B, as effected by operation of selector 112 by the system control unit 104, to assure that identical heat outputs are produced by heaters A and B. Unit 104 also produces a heater failure display on central display panel 108, as later described.

The illustrative sensor of FIG. 10 includes four thermocouples TC A1, TC A2, TC B1 and TC B2; in conventional fashion for a differential temperature sensor, one thermocouple of probe A is associated with a corresponding thermocouple of probe B and the two connected in series as a pair and in a bucking, or opposed, relationship. Thermocouple elements TC A1 and TC B1 are connected as a first pair and the thermocouple elements TC A2 and TC B2 are connected as a second, or complementary, such pair in the described series, bucking or opposed relationship. In FIG. 10, the two such pairs are designated TCP-1 and TCP-2. Continuity check unit 121 checks the continuity of the respective pairs of thermocouples on an on-going basis and, should lack of continuity indicating an element failure be detected, provides an output to TC failure alarm unit 120 for lighting the corresponding alarm lamp 120-1 or 120-2 corresponding to the respective, failed thermocouple pair TCP-1 or TCP-2, and to system control unit 104 for producing a failure display on central display panel 108, as later described.

Selector unit 122 is controlled to select the outputs of one or the other of the two TC TEMP CIRCUITS 124-1 and 124-2 to supply the selected one of said respective outputs T1 and T2 to the interface circuits 129. The selected one of the TC TEMP CIRCUITS 124-1 and 124-2 produces an output voltage signal STEMP proportional to the temperature differential (T) sensed by the selected thermocouple pair. Interface circuits 129 interconnect the units 120, 121, 122, 124-1 and 124-2 with the system control unit 104 through appropriate buses, as indicated. Unit 104 also produces a selectable T display on central display unit 104 during normal monitoring, displays of a failed sensor and failed heater/thermocouple pair, and an automatic and verified indication of an alarm condition for each sensor on the control display panel 108.

The duplex character of the sensors of the invention enable significant system operations facilitating more meaningful monitoring and verification capabilities. With reference to the schematic presentation of sensor I in FIG. 10 assume that selector 112 normally selects heater HTR A and selector 122 normally selects thermocouple pair TCP-1 comprising the thermocouples TC A1 and TC B1. Under normal operating conditions (and thus in the absence of water surrounding the dual probes A and B of sensor I), TC A1 will be heated by HTR A and sense a higher temperature, relatively to that sensed by TC B1 and, for an assumed polarity or sense in which the respective outputs are paired, an output STEMP of a positive T is produced. Conversely, if complementary heater B were selected and energized and thus substituted for heater A, under this same analysis, the STEMP output would be a negative T, i.e., the same numerical or absolute temperature differential value, but of opposite sign. As will be appreciated and as above-noted, the calibration circuit of unit 110, under direction of system control unit 104 and through adjustment thereby of the adjustable DC supply 116, provides for controlling the respective power levels supplied to heater A and to heater B, to assure that the same heater power is developed in HTR A and HTR B, resulting in the same absolute values of T being produced if the sensor is not fouled.

The system further uses the capability of the duplex sensor by automatically toggling, or switching, between heater A and heater B for substituting heater B for heater A upon failure of heater A (or vice versa), so as to provide continuous monitoring functions and so as to prevent false alarm that would otherwise result from a heater failure. For example, if heater A fails, unit 104 will operate through selector 112 to switch to heater B.

With reference to the TC controller 102 in FIG. 10, the duplex nature of the sensor also affords significant capabilities in the system encompassing the thermocouples, as well. Thus, if one or both of the thermocouple elements of pair TCP-1 should fail, as detected by continuity check circuit 121, system control unit 104 causes selector 122 to switch automatically to the second pair TCP-2, for supplying the output through TC TEMP circuit 124-2 and thus deriving the value STEMP ( T) therefrom. As shown in FIG. 10, TC A2 and TC B2 of the pair TCP-2 are connected in the same sense as the complementary, first pair TCP-1 of thermocouples TC A1 and TC B1. Thus, the same effective sign of T is produced upon the alternative selection of the complementary pair TCP-2 of heater elements HTR A and HTR B. It will be appreciated that a more complex, or sophisticated, arrangement with greater failure indicating capabilities could be achieved by reversing the sense of TC A2 and TC B2, and thus of the pair TCP-2 relative to the pair TCP-1. Thus, for example, when using a given heater, e.g., HTR A, if a first pair TCP-1 fails and the system automatically switches to a second pair TCP-2, and the sensor is otherwise operative, there results a negative T, i.e., a temperature differential output of the same numeric value but opposite sign. This then would indicate which thermocouple pair had failed, facilitating maintenance operations.

Physical replacement (i.e., as distinguished from automatic substitution) of the heater elements and of the thermocouple elements of the sensor may be made on-line, following specific identification of the failed element at the processor I which may be located remotely from the central panel 108. Thus, HTR and TC failure alarm displays 114 and 120 are shown as incorporated in the heater controller 100 and TC controller 102, respectively, it being understood that the displays 114 and 120 would be positioned at a convenient location for viewing by maintenance personnel. In the event that a failed element is detected, the corresponding alarm lamp 116 or 118 for heater A or heater B, or alarm lamp 120-1 or 120-2 for the thermocouple pairs TCP-1 and TCP-2, respectively, is illuminated.

Should both heaters, A and B, and/or both thermocouple pairs, TCP-1 and TCP-2, fail, that sensor channel is disabled so as to prevent a false alarm. Further, an in phase blinking of lamp 136 (FIG. 11A) and the alarm lamp for the failed channel informs the user that this channel has failed and has been disabled. Automatic toggling is performed for verification of a sensed alarm condition. Specifically, should the water level rise and surround both probes A and B, the normal T value will be reduced significantly to less than an alarm threshold value, but typically to a non-zero value. The alarm condition is automatically verifiable, therefor, by toggling to heaters and comparing the corresponding T value of STEMP. If not of the same numerical value (but of opposite sign), the conclusion may be reached that sensor I has been fouled and that the reduced T value is a false alarm. On the other hand, the failure of the sensor to pass the verification test, as thus conducted, serves to alert the operator to the need for system maintenance.

Figure 11A:
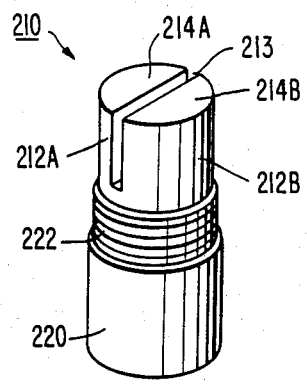
FIG. 11A is a simplified, perspective view of a split-well thermowell housing which, in more detail, may be substantially similar to that of FIG. 1 but has differing internal configurations in accordance with the second and third embodiments of the invention.

FIG. 11A is a perspective view of a split-well thermowell housing 210 representing the external configuration of both second and third embodiments of the invention, the latter being differentiated by internal configuration as Will be described. The external configuration of the sensor 210 may be substantially identical to the housing 10 of the FIG. 1, but because of the integrated feature, to be described, may be substantially smaller in size and thus have reduced heater power requirements; moreover, the integrated character reduces the number of heating and sensing elements, with concomitant savings in material, reduced electronic circuit complexity and reduced costs of manufacture and installation. For example, whereas the sensor housing 10 of FIG. 1 may be implemented for use as a one and one-half inch (1½") nipple pipe thread size, the sensor housing 210 instead may be constructed for use as a one inch (1") nipple pipe thread size device.

Similarly to housing 10 of FIG. 1, the housing 210 of FIG. 11A includes a pair of substantially half-cylinder probes 212A and 212B separated by a gap 213 defined by a bilateral plane symmetrical with respect to the axis of the housing 210. It will be understood that the housing 210, similarly to that of FIG. 1, comprises a shank portion 220 having a pipe thread 222 formed thereon or other alternative means for mounting the housing 210 through a suitable boss in a pipe or other pressure vessel. The shank 220 furthermore is bored to define a generally cylindrical chamber therewithin (not shown in FIG. 11A) substantially corresponding to the chamber 30 with base wall 32 in the housing 10 of FIG. 1.

Figure 11B:
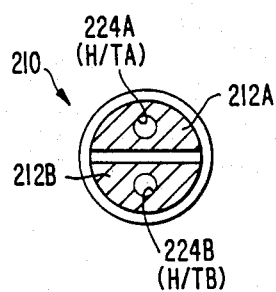
FIG. 11B is a cross-sectional view of the probe portion of the sensor housing of FIG. 11A, taken in a plane transverse to the central axis thereof, and illustrating the internal configuration thereof in accordance with the second embodiment of the invention.

FIG. 11B is a cross-sectional view taken in a plane perpendicular to the axis of the housing 210 through the probes 212A and 212B, for illustrating bores 224A and 224B disposed centrally and generally symmetrically within the respective probes 212A and 212B and extending in parallel axial relationship therethrough to positions adjacent the free ends 214A and 214B of the respective probes. In accordance with this embodiment of the invention, an integrated heater/thermometer element having a outward appearance and external dimensions which may be substantially identical to the heater element 95 of FIG. 8 is received in each of the bores 224A and 224B; the latter, correspondingly, may be of 0.257 inch diameter and 2.5 inch depth, as for the sensor 10 of FIG. 1. Such heater elements are not illustrated in FIG. 11B, but their locations are designated by the parenthetical expressions H/T A and H/T B adjacent the respective bores 224A and 224B.

The elements H/T A and H/T B comprise heater elements of nickel, iron or other similar pure metal which exhibits a substantially linear relationship, or dependence, of electrical resistance to temperature. As explained hereinafter with reference to FIGS. 13 through 15, one of the elements, for example, H/T A, is supplied with current of a sufficient level to function as a heater and simultaneously as a thermometer and thus as the heated element and the other, H/T B in the example, is supplied with a much lower current so as to render it negligible in effect as a heater element but to function nevertheless as a thermometer and thus as the reference element. Correspondingly for the example, probe 212A is the heated probe and probe 212B is the reference probe. As will be understood from the description of the first embodiment of the invention, the alternative presence of steam or water will result in respective, high and low temperature differentials being produced as the sensor output, as later discussed.

Figure 11C:
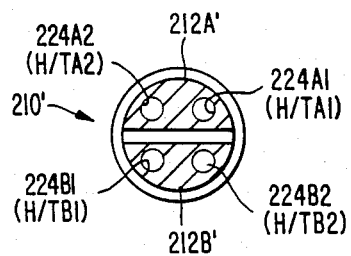
FIG. 11C is a cross-sectional view of the probe portion of the sensor housing of FIG. 11A, taken in a plane transverse to the central axis thereof, and illustrating the internal configuration thereof in accordance with the third embodiment of the invention.

FIG. 11C is a cross-sectional view taken in a plane transverse to the axis of housing 210 through the probes 212A and 212B, but wherein the internal configuration of the housing 210 is altered in accordance with a third embodiment of the invention so as to include four identical bores, bores 224A1 and 224A2 being disposed in probe 212A' and bores 224B1 and 224B2 being disposed in probe 212B', the bores each being of identical dimensions, as above, and spaced in symmetrical and equidistant relationship from the sidewalls of the respective probes 212A' and 212B'. Four heater/thermometer H/T (elements A1, A2, B1 and B2 are received in the correspondingly designated bores. The embodiment of FIG. 12C affords the full duplex capabilities of the sensor 10 of the first embodiment of the invention disclosed in FIGS. 1 through 8 and thus may be employed in lieu thereof in the system as disclosed and discussed above in relation to FIGS. 9 and 10, with modifications thereto as required to accommodate the integrated heater/thermometer character of the H/T elements. A system specifically designed to utilize the integrated sensor of FIG. 11C (and of a fourth embodiment, described hereinafter) moreover is disclosed in the above-referenced, concurrently-filed application.

Figure 12A:
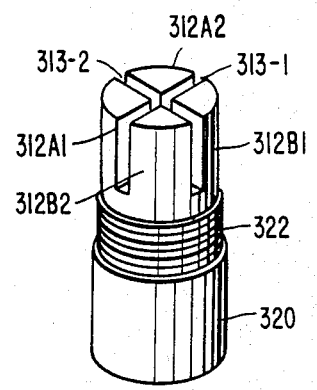
FIG. 12A is a simplified perspective view of a thermowell housing in accordance with a fourth embodiment of the invention having four probes defined by crossed bilateral planes.

FIG. 12A is a perspective view of a sensor housing 310 of a fourth embodiment, substantially corresponding to the housing 210 of FIG. 11A but having four, substantially quarter-cylinder probes 312A1 through 312B2, spaced by intersecting gaps 313-1 and 313-2 defined by crossed bilateral planes of mutually perpendicular relationship and symmetric with the axis of the housing 310. As seen in the cross-sectional view of FIG. 12B and adopting similar nomenclature as in FIG. 11C, bores 324A1 and 324A2 are formed in the respective probes 312A1 and 312A2, and bores 324B1 and 324B2 are formed in the respective probes 312B1 and 312B2, corresponding and respective heater/thermometer elements being received in the respective bores. The sensor employing the housing 310 permits operation of the respective diagonally related pairs of heater/thermometer elements (i.e., the pair H/T A1 and H/T B1, and the pair H/T A2 and H/T B2) as two fully independent, differential temperature sensors.

The sensors of FIGS. 11A to 12B furthermore may be provided with an electrical connector box and related structures substantially as disclosed for the first embodiment, but of simplified construction in view of the reduced number of electrical elements and related circuit connections required thereby.

Figure 12B:
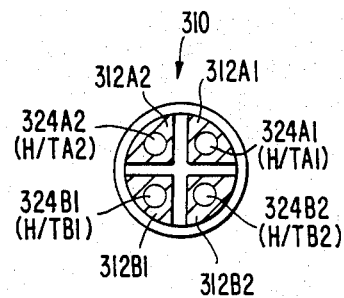
FIG. 12B is a cross-sectional view of the probes of the thermowell housing of FIG. 12A, taken in a plane transverse to the central axis of the latter.
Figure 13:
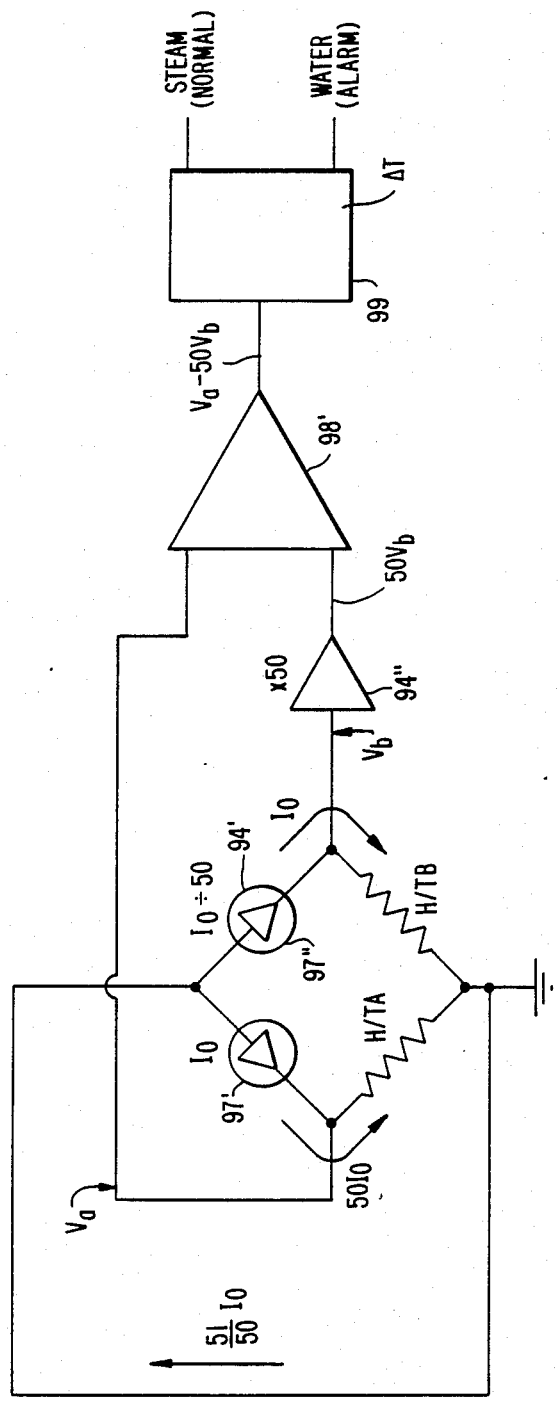
FIG. 13 is a simplified schematic of the current supplies and bridge circuit arrangement for both energizing and detecting a differential voltage, or voltage difference, representative of the differential between the temperatures sensed by the heater/thermometer elements associated as a pair in the integrated sensors of the embodiments of the invention shown variously in FIGS. 11A through 12B.

FIG. 13 is a simplified schematic of a circuit for both energizing a selected one of a related pair of heater/thermometer (H/T) elements A and B and for deriving from the respective voltage outputs thereof a differential voltage representative of the differential temperature sensed thereby; while illustrated for a single pair of related elements H/T A and H/T B such as employed in the housing 210 when internally configured as FIG. 11B, it will be understood that each of the diagonally related H/T element pairs, in each of the configurations of FIGS. 11C and 12B, would be similarly connected. Further, whereas typically a single such related H/T pair in the configuration of FIG. 11C would be selected at a time for such circuit connection and operation, both such pairs in the configuration of FIG. 12B may be so connected in respective such circuits for performing simultaneous sensing operations.

The operation of the circuit of FIG. 13 will now be discussed with reference to FIGS. 14 and 15. In FIG. 13, constant current sources 97' and 94' respectively supplying currents $I_O$ and $I_O \div 50$ are connected in respective first and second legs of a bridge circuit in series with corresponding elements H/T A and H/T B, the two legs being interconnected in parallel at the vertically related, first set of diagonally opposite junctions. The external circuit between those junctions accordingly carries the current $51/50 \, I_O$. The voltage outputs $V_a$ and $V_b$ at the horizontal, second set of diagonally opposite junctions are supplied to the inputs of differential amplifier 98', the voltage $V_b$ first being multiplied by a proportionality factor ("x50") by circuit 94''. The proportionality factor is the inverse of the current differential supplied through the two legs by the sources 97' and 94' so as to enable comparison of the voltage outputs $V_a$ and $V_b$, circuit 94'' accordingly producing the output $50V_b$ supplied to the second input of the differential amplifier 98'. The differential voltage output of the differential amplifier 98', $V = V_a - 50V_b$, thus is representative of the temperature differential between the temperatures sensed by the elements H/T A and H/T B, i.e., T=k( V). The V output from differential amplifier 98' is applied to a trigger and alarm circuit 99 which produces outputs indicating the sensed condition of steam (normal) or water (alarm), and which may be the respective, actual T values.

Because of the complementary functions of circuits 94' and 94'', the temperature sensing function of heater element H/T B is equivalent to that of element H/T A, but whereas H/T A functions additionally as the heated element, substantially no heating, i.e., insignificant heating, of H/T B occurs and the latter thus serves as the reference element. The thermal function of an H/T element pair of the integrated sensors 210 and 310 is explained using the following definitions of temperature and differential temperatures:

T(H₂O)—temperature of the steam or water within the pipe or vessel.

T(IWDI-STEAM)—temperature drop between the outer surface of the probes 212A and 212B and steam. This is typically 60° F.

T(IWDI-WATER)—temperature drop between the outer surface of the probes 212A and 212B and water. This is typically 0° F.

T(METAL)—temperature drop across the metal surrounding the bore (e.g., 224A) of the heated probe (212A). This is small and is assumed to be zero.

T(IWDI-H/T) temperature drop across the (air) gap between the inner surface of the bore 224A in the probe 212A and the heated element, H/T A, typically 20° F.

Figure 14:
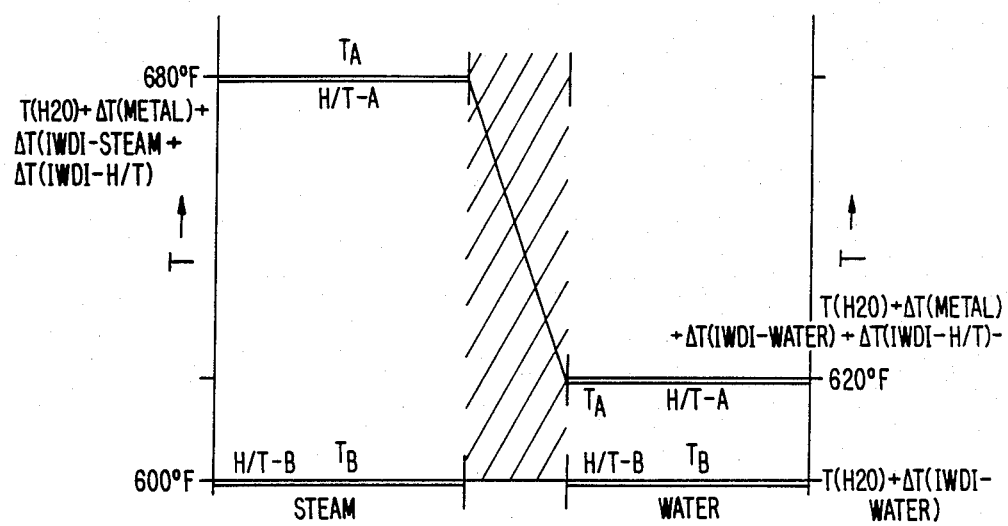
FIG. 14 is a temperature diagram used for explaining the temperature levels sensed by, and the corresponding differential produced by an associated pair of heater/thermometer elements in accordance with the integrated sensor embodiments of the present invention.

The changes in the respective, sensed temperatures of H/T A and H/T B ($T_a$ and $T_b$) in steam and water are shown in FIG. 14. The differential amplifier 98' shown in FIG. 13 subtracts out T(H₂O) which is common to H/T A and H/T B. T(IWDI-H/T) depends solely on the power dissipated in H/T A for bore H/T gaps $\leq 10$ mils. Since power level supplied to H/T A (i.e., current $I_O$) and that supplied to H/T B (i.e., current $I_O \div 50$) are held nearly constant by source 97' and 94', T(IWDI-H/T) remains nearly constant.

The temperature of H/T A in steam is then:

$$T_A = T(H_2O)) + T(IWDI-STEAM) + T(IWDI-H/T) \quad (1)$$

In water, TA falls to:

$$T_A = T(H_2O) + T(IWDI-H/T) \quad (2)$$

The temperature of H/T B remains:

$$T_B = T(H_2O) \quad (3)$$

in steam and in water. The differential temperature is thus:

$$T = T_a - T_b = k(V_a - 50V_b) = T(IWDI-STEAM) + T(IWDI-H/T) \quad (4)$$

in steam; and $$T = T(IWDI-H/T) \quad (5)$$

in water. This represents a change in T of, typically, T=80° F. in steam to T=20° F. in water.

Figure 15:
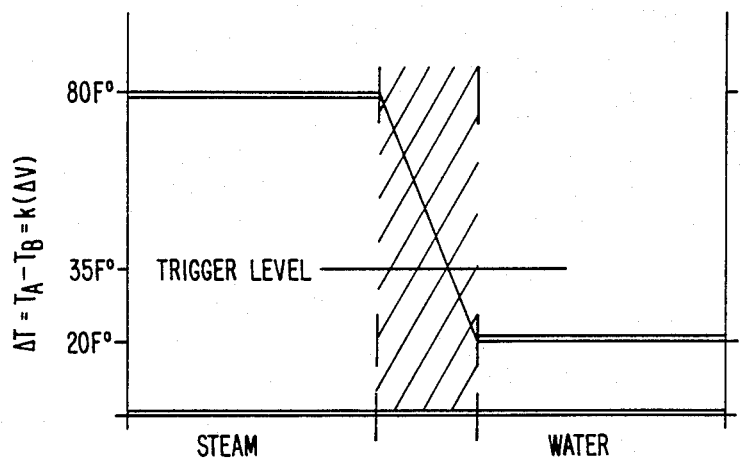
FIG. 15 is a temperature diagram illustrating the basis for setting a trigger level for delineating between the differential voltage outputs of the circuit of FIG. 13, respectively representative of an indication of steam and water.

FIG. 15 is a temperature diagram indicating the above, typical values o the temperature differentials T of 80° F. in the case of steam and 20° F. in the case of water being present and sensed and, particularly, graphically illustrating the typical, 60° F. variation in those respective differential temperatures. FIG. 15 moreover illustrates a trigger level value of T=35° F., a drop of somewhat less than half of the temperature range between the respective steam- and water-temperature differential values, for rendering a determination of the alarm condition that water is present. As implemented in FIG. 13, the trigger and alarm circuit 99 may utilize a voltage threshold value corresponding to T=35° F. as a trigger level for automatically delineating between and providing, as an output, either a steam (normal)

condition indication or a water (alarm) condition indication.

The sensor 310 of FIGS. 12A and 12B has the same functional capabilities as that of FIG. 11C and that of FIGS. 1-8 and thus may function as a full duplex sensor as described in relation to FIGS. 1-8. In fact, because the sensor 310 additionally has the capability of functioning as two independent temperature differential sensors, it may provide, by a logical combination of the respective temperature differential indications of the two independent H/T element pairs, a "voting" function as to the condition detected, thus affording a self-verification capability. Adopting, for simplicity, solely the designations A1, A2, B1, and B2 for the four H/T elements:

| Pair A1-B1 | Pair A2-B2 | Detected Condition Indication |
| --- | --- | --- |
| high T | high T | Normal |
| high T | low T | Fault |
| low T | high T | Fault |
| low T | low T | Alarm |

It will be understood that the operations of the embodiments of FIGS. 11C and 12B as to each related H/T pair thereof, when selected for operation, is as well fully explained by the foregoing equations (1) through (5), with the minor qualification that certain of the typical temperature drops specified in the definitions may vary somewhat, particularly for the configuration of FIG. 12B due to the reduced mass and wall thickness of the individual probes, assuming same to be formed in a housing 310 corresponding otherwise in dimensions and material to the housing 210.

The sensors, or detectors, in the various embodiments thereof herein disclosed uniformly afford numerous beneficial structural and operating features which offer significant solutions to needs in the industry. Each is of rugged construction, assuring long life, while of relatively simple configuration and reduced size. Size reduction is significant, both in reducing cost of manufacture and installation but also since enhancing mechanical strength and thermal performance. Each of the embodiments enables on-line replaceability of its H/T elements, while remaining fully functional by automatic substitution of the complementary elements thereof. Those embodiments affording a duplex structure and operation offer greatly improved monitoring and verification capabilities in a system which incorporates same. These advantages are realized even more fully in the integrated sensors 210 and 310, the latter thereof affording yet greater capabilities of voting and self-verification with regard to the logic combination of the two independent differential outputs.

Numerous modifications and adaptations of the sensors and the instrumentation system of the present invention will be apparent to those of skill in the art and thus it is intended by the following claims to cover all such modifications and adaptations which fall within the true spirit and scope of the invention.

I claim as my invention:

1. A differential temperature sensor housing, adapted to be mounted to the sidewall of a pressure vessel and to communicate through a penetration in the sidewall with the fluid state in the pressure vessel, comprising:

a generally cylindrical shank defining a central axis and having a first, free end and a second end;
at least two substantially identical probes each having first and second ends, the first ends thereof forming an integral juncture with the second end of the shank and the probes extending therefrom in laterally spaced relationship relative to the central axis, the probes together defining an outer circumference of reduced diameter relative to the diameter of the shank;
a generally cylindrical chamber extending coaxially within the shank from the free end thereof and defining a base wall transverse to the central axis adjacent the integral juncture;
the probes having corresponding, symmetrically disposed bores therein, extending in parallel axial relationship relative to the central axis from the base wall and toward the second end of the probe, for receiving associated heater and temperature sensing elements therein; and
each pair of two probes being related as a differential temperature sensor, selective energization of the heater element of one of the related probes establishing that probe as the heated probe and the other probe of the pair as the reference probe.

2. A differential temperature sensor housing as recited in claim 1, wherein the sensor housing is formed of a metallic, low heat conducting material.

3. A differential temperature sensor housing as recited in claim 1, wherein:
the integral juncture of the first ends of the probes and the second end of the shank, in conjunction with the housing being mounted to the sidewall of a pressure vessel, defining a heat sink for thermally isolating the related probes of each differential temperature sensor pair.

4. A differential temperature sensor housing as recited in claim 1, further comprising:
mounting means integrally formed on the surface of the generally cylindrical shank, in a circumferential portion thereof of limited axial extent intermediate the first and second ends thereof.

5. A differential temperature sensor housing as recited in claim 4, wherein:
the mounting means comprises an annular pipe thread integrally formed in the circumferential portion of the shank.

6. A differential temperature sensor housing as recited in claim 4, wherein:
the mounting means is disposed at an axial position of the shank such that when the housing is mounted so as to extend through a penetration in the sidewall of a pressure vessel, the probes are disposed within the interior of the pressure vessel and the free end of the shank is disposed toward and accessible from the exterior of the pressure vessel sidewall.

7. A differential temperature sensor housing as recited in claim 4, wherein:
the integral juncture of the first ends of the probes and the second end of the shank, in conjunction with the housing being mounted to the sidewall of a pressure vessel, defining a heat sink for thermally isolating the related probes of each differential temperature sensor pair.

8. A differential temperature sensor housing as recited in claim 1, wherein:

the related first and second probes of a pair are each of substantially identical, part-cylindrical configuration in cross-section and are laterally spaced by at least one slot defined by a corresponding bilateral plane symmetrically disposed relatively to the central axis and extending from the integral juncture to the second ends of the probes.

9. A differential temperature sensor housing as recited in claim 1, wherein:
the related first and second probes of a pair are each of substantially identical, half-cylindrical configuration, and are laterally spaced by a slot defined by a bilateral plane symmetrically disposed relatively to the central axis and extending from the integral juncture to the second ends of the probes.

10. A differential temperature sensor housing as recited in claim 9, wherein:
each probe has a single bore symmetrically disposed therein for receiving an integrated heater/temperature sensing element.

11. A differential temperature sensor housing as recited in claim 9, wherein:
each probe has two bores symmetrically disposed therein for receiving, in each, an integrated heater/temperature sensing element.

12. A differential temperature sensor housing as recited in claim 9, wherein:
each probe has a first bore, centrally disposed therein for receiving a heater element and a further pair of bores symmetrically disposed therein relatively to the central bore for receiving respective, first and second temperature sensing elements.

13. A differential temperature sensor housing as recited in claim 1, wherein:
the related first and second probes of a pair are each of substantially identical, quarter-cylinder configuration in cross-section and are laterally spaced by first and second, intersecting slots defined by corresponding first and second, intersecting bilateral planes symmetrically disposed relatively to the central axis and extending from the integral juncture to the second ends of the probes.

14. A differential temperature sensor housing as recited in claim 13, wherein:
each of the quarter-cylinder probes has a single bore therein for receiving an integrated heater/temperature sensing element.

15. A differential temperature sensor housing as recited in claim 1, further comprising:
an annular collar integrally formed in the exterior surface of the sensor housing adjacent the integral juncture of the shank and the probes and coaxial with the central axis;
a shield of generally cylindrical configuration comprising a cylindrical sidewall, an end wall and an open end, at least the sidewall having plural holes therethrough, the shield having an interior diameter substantially the same as the exterior diameter of the collar and an axial length greater than the axial length of the probes and received coaxially about and enclosing the probes therewithin; and
the open end of the shield being received on and secured to the annular collar.

16. A differential temperature sensor, comprising;
a sensor housing adapted to extend through a penetration in, and be mounted to, the sidewall of a pressure vessel and comprising:

a generally cylindrical shank defining a central axis and having a first, free end and a second end;
at least two substantially identical probes, each pair of two probes being related as a differential temperature sensor and each probe having first and second ends, the first ends thereof forming an integral juncture with the second end of said shank and the probes extending therefrom in laterally spaced relationship relative to the central axis, the probes together defining an outer circumference of reduced diameter relative to the diameter of the shank;
a generally cylindrical chamber extending coaxially within the shank from the free end thereof and defining a base wall transverse to the central axis adjacent the integral juncture;
the probes having corresponding, symmetrically disposed bores therein, extending in parallel axial relationship relative to the central axis from the base wall and toward the second end of the probe;
heater and temperature sensing elements being received in the bores of the two related probes of each pair; and
selective energization of the heater element of one of the related probes establishing that probe as the heated probe and the other probe of the pair as the reference probe of a differential temperature sensor.

17. A differential temperature sensor as recited in claim 16, wherein:
the related first and second probes of a pair are each of substantially identical, part-cylindrical configuration in cross-section and are laterally spaced by at least one slot defined by a corresponding bilateral plane symmetrically disposed relatively to the central axis and extending from the integral juncture to the second ends of the probes.

18. A differential temperature sensor as recited in claim 16, wherein:
the related first and second probes of a pair are each of substantially identical, half-cylindrical configuration, and are laterally spaced by a slot defined by a bilateral plane symmetrically disposed relatively to the central axis and extending from the integral juncture to the second ends of the probes.

19. A differential temperature sensor as recited in claim 18, further comprising:
a single bore symmetrically disposed in each probe; and
an integrated heater/temperature sensing element received in the bore of each probe.

20. A differential temperature sensor as recited in claim 18, further comprising:
two bores symmetrically disposed in each probe; and
an integrated heater/temperature sensing element received in each bore of each probe.

21. A differential temperature sensor as recited in claim 18, further comprising:
a first bore, centrally disposed in each probe and a further pair of bores symmetrically disposed therein relatively to the central bore; and
a heater element received in the central bore and a pair of temperature sensing element respectively received in the further pair of bores.

22. A differential temperature sensor as recited in claim 16, wherein:
the related first and second probes of a pair are each of substantially identical, quarter-cylinder configuration in cross-section and are laterally spaced by first and second, intersecting slots defined by corresponding first and second, intersecting bilateral planes symmetrically disposed relatively to the central axis and extending from the integral juncture to the second ends of the probes.

23. A differential temperature sensor as recited in claim 22, further comprising:
- a single bore in each of the quarter-cylinder probes; and
- an integrated heater/temperature sensing element received in the bore of each probe.

24. A differential temperature sensor assembly, comprising:
- a sensor housing, adapted to be mounted to the sidewall of a pressure vessel and to communicate through a penetration in the sidewall with the fluid state in the pressure vessel, comprising:
  - a generally cylindrical shank defining a central axis and having a first, free end and a second end;
  - at least two substantially identical probes each pair of two probes being related as a differential temperature sensor and each probe having first and second ends, the first ends thereof forming an integral juncture with the second end of the shank and the probes extending therefrom in laterally spaced relationship relative to the central axis, the probes together defining an outer circumference of reduced diameter relative to the diameter of the shank;
  - a generally cylindrical chamber extending coaxially within the shank from the free end thereof and defining a base wall transverse to the central axis adjacent the integral juncture;
  - the probes having corresponding, symmetrically disposed bores therein, extending in parallel axial relationship relative to the central axis from the base wall and toward the second end of the probe;
  - heater and temperature sensing elements being received in the bores of the two related probes of each pair, therein; and
  - selective energization of the heater element of one of the related probes establishing that probe as the heated probe and the other probe of the pair as the reference probe;
- a connector box; and
- an extension assembly of generally cylindrical configuration having a first end secured to a central portion of the connector box and a second end, and means for releasably connecting the extension assembly in axially aligned relationship with the sensor housing.

25. A sensor assembly as recited in claim 24, wherein there is further provided:
- a concentric annular ledge at the free, first end of the generally cylindrical shank of the housing, of reduced diameter relative to the maximum diameter of the shank; and
- the extension assembly comprises a generally cylindrical sleeve having first and second ends and an interior diameter corresponding to the exterior diameter of the concentric annular ledge, the first end of the sleeve being releasably received on the annular ledge, and means for axially securing the extension assembly and connector box to the sensor housing.

26. A sensor assembly as recited in claim 25, wherein:
- the connector box comprises a base plate having a central opening therein smaller in size alignment with and secured to the second end of the sleeve; and
- the extension assembly further comprises a plurality of tubes respectively corresponding to the plurality of bores in the probes, each tube having a first end releasably connected to the respectively associated bore and a second end disposed at and substantially contiguous with the plane of the interior surface of the base plate of the connector box, a mounting plate spanning the opening in the base plate and engaging, in abutting relationship, the second ends of the plurality of tubes, and means securing the mounting plate to the free end of the shank for securing the extension assembly and connector box to the sensor housing.

* * * * *